(No Model.)
J. BROUGHTON, Dec'd.
M. BROUGHTON, administratrix.
EXTENSION KEY.
No. 299,456. Patented May 27, 1884.
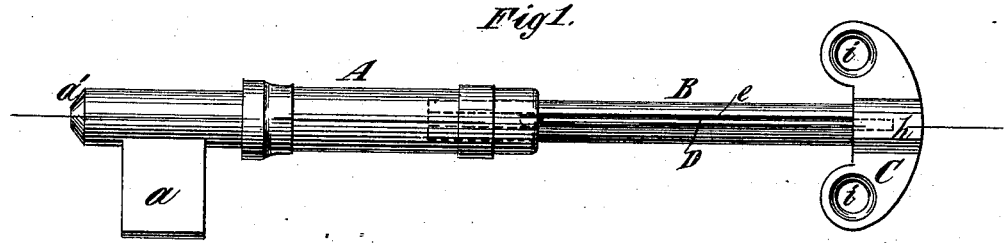
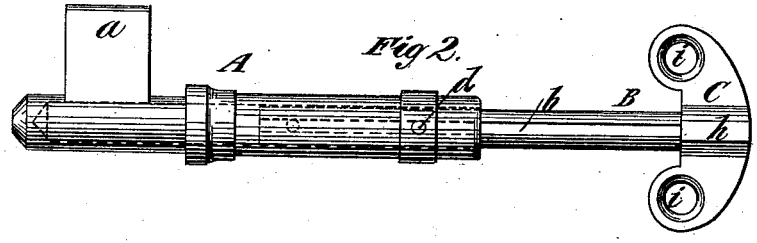
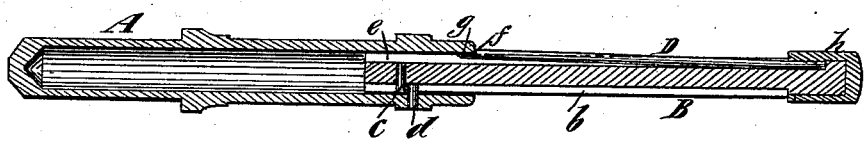
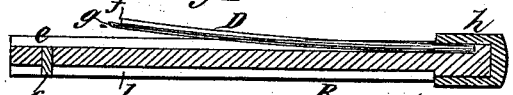
Witnesses
John Becker
Fred Haynes
Inventor
John Broughton
by his Attorneys
Brown & Brown

United States Patent Office.

JOHN BROUGHTON, OF BROOKLYN, NEW YORK; MARY BROUGHTON ADMINISTRATRIX OF SAID BROUGHTON, DECEASED, ASSIGNOR TO DANIEL H. FITZGERALD, OF READING, PENNSYLVANIA.

EXTENSION-KEY.

SPECIFICATION forming part of Letters Patent No. 299,456, dated May 27, 1884.

Application filed June 8, 1881. Renewed October 10, 1883. (No model.)

*To all whom it may concern:*

Be it known that I, JOHN BROUGHTON, of Brooklyn, in the county of Kings and State of New York, have invented a certain new and useful Improvement in Extension-Keys for Locks, of which the following is a specification.

My invention relates to extension-keys for door and other locks, which comprise a barrel upon which is fixed the bit of the key, and which is bored out to receive a stem or shank, which may be moved longitudinally therein to lengthen or shorten the key.

The object of my invention is to simplify and lessen the cost of manufacture of such keys.

To this end the invention consists in various details of construction, hereinafter particularly described and claimed, whereby the desired end is attained.

In the accompanying drawings, Figure 1 represents a side view of a key embodying my improvements extended for use. Fig. 2 represents a view of the other side of the same when partially contracted. Fig. 3 represents a longitudinal section of the key extended for use, and Fig. 4 represents a longitudinal section of the shank or stem detached from the barrel.

Similar letters of reference designate corresponding parts in all the figures.

A designates the barrel, and B the shank or stem, of the key, fitting and adapted to slide longitudinally therein. Upon the barrel is the bit $a$, and to the outer end of the shank or stem is attached the bow C of the key, which is made in a separate piece by casting or otherwise. The barrel A may have a solid nib, $a'$; or the barrel may be bored entirely through and the shank or stem project flush with the end of the nib.

In one side of the shank or stem B, as shown clearly in Fig. 3, is a longitudinal groove, $b$, and near the inner end of the shank or stem is a shoulder, $c$, in said groove, which may be made by inserting a pin therein. The barrel A has inserted through one side a pin, $d$, which engages with the groove $b$ and prevents the shank or stem from turning relatively to the barrel. When the shank or stem is pulled out to extend the key, the pin $d$ engages with the shoulder $c$ and forms a stop, which prevents the shank or stem from being pulled entirely out of the barrel.

In the side of the shank or stem B, opposite the groove $b$, is a second longitudinal groove, $e$, and in this groove is a spring, D, which is secured at or near the outer end of the shank or stem, and the inner end of which springs outward when released from the barrel, as shown in Fig. 4. At the inner end of the spring is formed a shoulder, $f$, which engages with the end of the barrel and prevents the shank or stem from being pushed into the barrel until the spring is pressed down into the groove. The stop-pin $d$ is so placed relatively to the shoulder $f$ upon the spring that the instant the shoulder $f$ passes the end of the barrel in drawing the shank or stem outward the shoulder $c$ in the groove $b$ strikes said pin, and prevents the shank or stem from being drawn out far enough to disengage the lip $g$ of the spring, which projects beyond the shoulder $f$, from the barrel.

The shanks or stems B may be cheaply made from wire drawn with the two grooves $b$ and $e$, and when so made the spring D may be conveniently secured in place by turning down the outer end of the shank or stem, so that the spring, when placed in the groove, will project very slightly beyond the side of said turned-down portion, and then driving the shank or stem into a socket, $h$, in the bow C, which bites tightly on the spring and securely holds it in place.

In order to reduce the length of the key when contracted, I preferably construct the bow so that the loops $i$ thereof are entirely within the outer end of the socket $h$; and, indeed, the loops extend inward or backward of the inner end of the socket, and when the key is contracted they overlap the end of the barrel, which abuts against the inner end of the socket $h$.

By my invention I enable extension-keys of the kind above described to be manufactured at a less cost than heretofore, and I also provide a key in which the difference between the extended and contracted length is as great as possible.

I am aware that extension-keys have been in use for a long time. I am aware that it is old to make such a key with a barrel having in it a square hole and a square stem sliding therein; and I am also aware that it is old to place a spring in a longitudinal groove in the stem for resisting longitudinal movement thereof.

What I claim as my invention, and desire to secure by Letters Patent, is—

The extension-key herein described, comprising the barrel A, the wire stem B, provided with grooves $b$ $e$, the shoulder $c$ in the groove $b$, and the stop-pin $d$ in the barrel, the spring D, fitting in the groove $e$, and having the shoulder $f$ and projecting lip $g$, and the bow C, into which the stem and the spring are driven, all combined substantially as specified.

This specification signed this 15th day of July, 1880.

JOHN BROUGHTON.

Witnesses:
FREDK. HAYNES,
ARTHUR C. WEBB.